（12） United States Patent
Jacob et al.

(10) Patent No.: US 10,795,082 B1
(45) Date of Patent: Oct. 6, 2020

(54) BRAGG GRATINGS WITH AIRGAP CLADDING

(71) Applicant: GLOBALFOUNDRIES Inc., Grand Cayman (KY)

(72) Inventors: Ajey Poovannummoottil Jacob, Watervliet, NY (US); Yusheng Bian, Ballston Lake, NY (US); Theodore Letavic, Putnam Valley, NY (US); Kenneth J. Giewont, Hopewell Junction, NY (US); Steven M. Shank, Jericho, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/540,452

(22) Filed: Aug. 14, 2019

(51) Int. Cl.
*G02B 6/124* (2006.01)
*G02B 6/12* (2006.01)
*G02B 6/13* (2006.01)

(52) U.S. Cl.
CPC ......... *G02B 6/124* (2013.01); *G02B 6/12004* (2013.01); *G02B 6/13* (2013.01); *G02B 2006/12107* (2013.01); *G02B 2006/12173* (2013.01)

(58) Field of Classification Search
None
See application file for complete search history.

(56) References Cited

U.S. PATENT DOCUMENTS

| 2003/0053733 | A1* | 3/2003 | Wang | G02B 6/124 385/10 |
| 2003/0053734 | A1* | 3/2003 | Wang | G02B 6/12007 385/10 |
| 2007/0189669 | A1* | 8/2007 | Tormen | G02B 6/124 385/37 |
| 2014/0098833 | A1* | 4/2014 | Kim | H01S 5/105 372/44.011 |

OTHER PUBLICATIONS

Li et al., "Study of lateral-drilled DBR fiber laser and its responsivity to external refractive index," Opt. Express 24, 9473-9479 (2016).
He, et al., "Widely Wavelength-Selectable Lasers With Digital Concatenated Grating Reflectors—Proposal and Simulation," in IEEE Photonics Technology Letters, vol. 20, No. 21, pp. 1754-1756, Nov. 1, 2008.
Phelan, et al., "Multi-species gas sensing using monolithic widely tuneable laser diodes", Proc. SPIE 5826, Opto-Ireland 2005: Optical Sensing and Spectroscopy, (Jun. 3, 2005).

(Continued)

*Primary Examiner* — Jerry Rahll
(74) *Attorney, Agent, or Firm* — Thompson Hine LLP; Anthony Canale

(57) ABSTRACT

Structures that include a Bragg grating and methods of fabricating a structure that includes a Bragg grating. Bragg elements are positioned adjacent to a waveguide. The Bragg elements are separated by grooves that alternate with the Bragg elements. A dielectric layer includes portions positioned to close the grooves to define airgaps. The airgaps are respectively arranged between adjacent pairs of the Bragg elements. The Bragg elements may be used to form the Bragg grating.

20 Claims, 3 Drawing Sheets

(56) References Cited

OTHER PUBLICATIONS

Graham et al, "Controlled Spontaneous Lifetime in Microcavity Confined InGaAlAs/GaAs Quantum Dots", Appl. Phys. Lett. 72, 1670 (1998).
Bruccoleria et al., "Fabrication process for 200 nm-pitch polished freestanding ultrahigh aspect ratio gratings", Journal of Vacuum Science & Technology B 34, 06KD02 (2016).
Marchetti et al., "High-efficiency grating-couplers: demonstration of a new design strategy", Scientific Reports vol. 7, Article No. 16670 (2017).
Li et al., "High-performance binary blazed grating coupler used in silicon-based hybrid photodetector integration" Optical Engineering, 53(9), 097106 (2014).
Julien Flappich, "Nano-LED could support multi-Gbitls on chip traffic", Eenews Europe, Feb. 3, 2017, retrieved from the internet at https://www.eenewseurope.com/news/nano-led-could-support-multi-gbits-chip-traffic.
Yoshinaga et al., "Mid-infrared quantum cascade laser integrated with distributed Bragg reflector", Proceedings vol. 9755, Quantum Sensing and Nano Electronics and Photonics XIII (2016).

* cited by examiner

US 10,795,082 B1

BRAGG GRATINGS WITH AIRGAP CLADDING

BACKGROUND

The present invention relates to photonics chips and, more specifically, to structures that include a Bragg grating and methods of fabricating a structure that includes a Bragg grating.

Photonics chips are used in many applications and systems including, but not limited to, data communication systems and data computation systems. A photonics chip integrates optical components, such as waveguides and bends, and electronic components, such as field-effect transistors, into a unified platform. Among other factors, layout area, cost, and operational overhead may be reduced by the integration of both types of components.

A Bragg grating is a diffraction-based structure that may be utilized as an optical component in a photonics chip. A Bragg grating may be formed from diverse materials with varying refractive index, which results in periodic variation in the refractive index. Each boundary between materials of different refractive index reflects a portion of an optical wave traversing the Bragg grating.

Improved structures that include a Bragg grating and methods of fabricating a structure that includes a Bragg grating are needed.

SUMMARY

In an embodiment of the invention, a structure includes a waveguide and a plurality of Bragg elements positioned adjacent to the waveguide. The plurality of Bragg elements are separated by a plurality of grooves that alternate with the plurality of Bragg elements. The structure further includes a dielectric layer having portions positioned to close the plurality of grooves to define a plurality of airgaps. The plurality of airgaps are respectively arranged between adjacent pairs of the first plurality of Bragg elements.

In an embodiment of the invention, a method includes patterning a semiconductor layer to form a plurality of Bragg elements positioned adjacent to a waveguide, and depositing a dielectric layer on the plurality of Bragg element. The plurality of Bragg elements are separated by a plurality of grooves that alternate with the plurality of Bragg elements, and the dielectric layer includes portions positioned to close the plurality of grooves to define a plurality of airgaps.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
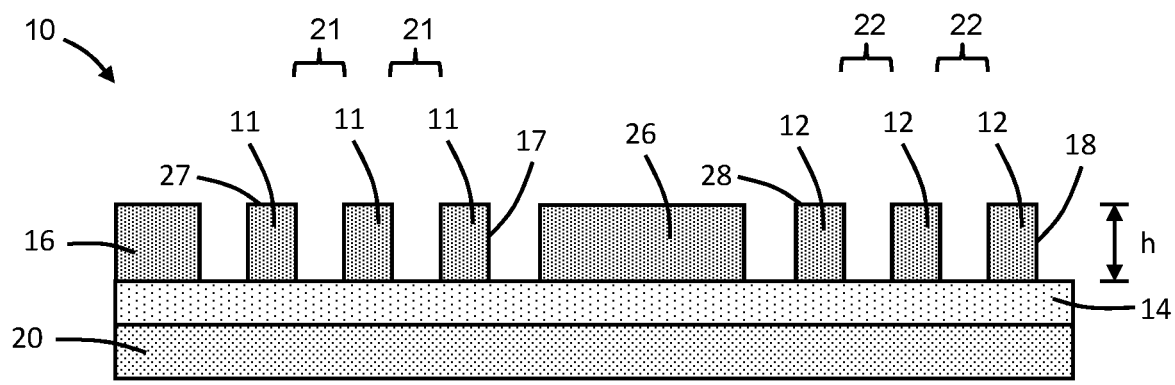
FIGS. 1-3 are cross-sectional views of a structure at successive fabrication stages of a processing method in accordance with embodiments of the invention.

With reference to FIG. 1 and in accordance with embodiments of the invention, a structure 10 includes a Bragg grating having Bragg elements 11, 12 that are positioned over a dielectric layer 14. The dielectric layer 14 may be composed of a dielectric material, such as silicon dioxide. The dielectric layer 14 may be a buried insulator layer of a silicon-on-insulator (SOI) wafer, which further includes a substrate 20 composed of a single-crystal semiconductor material. A waveguide 16 is also positioned over the dielectric layer 14. The Bragg elements 11 are laterally positioned between the waveguide 16 and the Bragg elements 12.

The Bragg elements 12 have side surfaces or sidewalls 18 that are separated by grooves 22 to define a portion of a grating. The grooves 22 are trenches that may extend to the dielectric layer 14 to define respective spaced-apart spaces or gaps arranged between adjacent pairs of Bragg elements 12. The dielectric layer 14 may be exposed at the bottom of the grooves 22 between adjacent pairs of Bragg elements 12. The Bragg elements 12 may have a periodicity given by a pitch. The grooves 22 may have an aspect ratio in which the height, h, of the Bragg elements 12 normal to the top surface of the dielectric layer 14 is greater than the width of the grooves 22. In an embodiment, the grooves 22 may have a pitch that is equal to the pitch of the Bragg elements 12, and the pitches may be established using Bragg's law for the given wavelength. In alternative embodiments, the pitch of the Bragg elements 12 may be apodized to provide a non-uniform spacing.

The Bragg elements 11 have side surfaces or sidewalls 17 that are separated by grooves 21 to define another portion of the grating. The grooves 21 are trenches that may extend to the dielectric layer 14 to define respective spaced-apart spaces or gaps arranged between adjacent pairs of Bragg elements 11. The dielectric layer 14 may be exposed at the bottom of the grooves 22 between adjacent pairs of Bragg elements 11. The Bragg elements 11 may have a periodicity given by a pitch. The grooves 21 may have an aspect ratio in which the height, h, of the Bragg elements 11 is greater than the width of the grooves 21. In an embodiment, the grooves 21 may have a pitch that is equal to the pitch of the Bragg elements 11, and the pitches may be established using Bragg's law for the given wavelength. In alternative embodiments, the pitch of the Bragg elements 11 may be apodized to provide a non-uniform spacing.

The Bragg elements 11, 12 and grooves 21, 22 may be formed by patterning the single-crystal semiconductor material (e.g., single-crystal silicon) of the device layer 26 of the SOI wafer with lithography and etching processes to define the grooves 22. To that end, an etch mask may be formed by a lithography process over the device layer 26, and the masked device layer 26 may be etched with an etching process, such as reactive ion etching (ME). The etching process may be selected to stop on the material of the dielectric layer 14 after penetrating fully through the device layer 26. The etching process may also form the waveguide 16 from the device layer 26 and also leave intact a section of the device layer 26 positioned laterally between the Bragg elements 11 and the Bragg elements 12.

The Bragg elements 11, 12 and the section of the device layer 26 may be coplanar with respective upper and lower surfaces that are coplanar and that are separated by a distance equal to the height, h. The grooves 21, 22 may have respective entrances that are coplanar with the Bragg elements 11, 12 at their respective top surfaces 27, 28.

Figure 2:
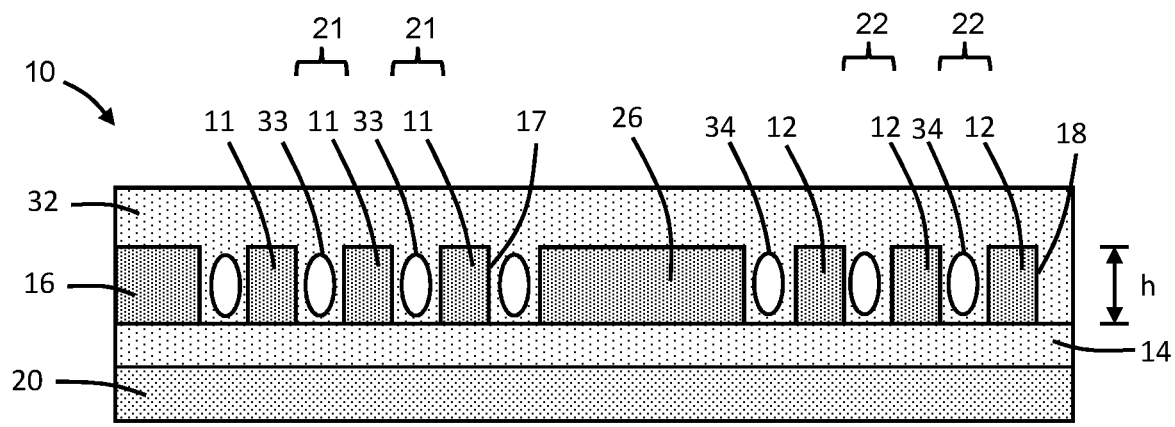

With reference to FIG. 2 in which like reference numerals refer to like features in FIG. 1 and at a subsequent fabrication stage, a dielectric layer 32 is deposited over the Bragg elements 11, 12. The dielectric layer 32 may be composed of a dielectric material and, in an embodiment, the dielectric layer 32 may be composed of silicon dioxide deposited by, for example, plasma-enhanced chemical vapor deposition. A continuous layer portion of the dielectric layer 32 is located with a given thickness over the top surfaces 27, 28 of the Bragg elements 11, 12. Portions of the dielectric layer 32 also bridge the entrance to each groove 21, 22 as respective closures such that the entrance to each of the grooves 21, 22 is fully occluded and closed by the dielectric layer 32. The aspect ratio of the grooves 21, 22 and the pitch of the Bragg elements 11, 12 promotes necking leading to the formation of the closures.

Airgaps 33 are respectively formed inside the grooves 21 between adjacent pairs of the Bragg elements 11, and airgaps 34 are respectively formed inside the grooves 22 between adjacent pairs of the Bragg elements 12. In an embodiment, the dielectric layer 32 may neck and pinch-off without depositing dielectric material on the sidewalls 17, 18 of the Bragg elements 11, 12. In an embodiment, portions of the dielectric layer 32 may deposit on surfaces the sidewalls 17, 18 of the Bragg elements 11, 12 prior to pinch-off. In an embodiment, the grooves 21, 22 may be partially filled by the dielectric layer 32 such that each of the airgaps 33, 34 is at least partially surrounded by portions of the dielectric layer 32. In an embodiment, portions of the dielectric layer 32 may fully surround the respective airgaps 33, 34. In that regard, portions of the dielectric layer 32 may deposit on the sidewalls 17, 18 of the Bragg elements 11, 12 and on the sections of the dielectric layer 14 exposed at the bottom of the grooves 21, 22. In an embodiment, native oxide may form on the sidewalls 17, 18 of the Bragg elements 11, 12 during the deposition of the dielectric layer 32 even though the dielectric layer 32 does not directly deposit on the sidewalls 17, 18 of the Bragg elements 11, 12.

The closures provided by the necked portions of the dielectric layer 32 may be located at or near a plane extending laterally across the entrance to each groove 21, 22. The entrance plane may be coplanar with the top surfaces 27, 28 (FIG. 1) of the Bragg elements 11, 12. In an embodiment, the closures provided by the portions of the dielectric layer 32 may be located below the plane of the entrance to each groove 21, 22. In an embodiment, the closures provided by the portions of the dielectric layer 32 may be located above the plane of the entrance to each groove 21, 22. In an embodiment, the closures provided by the portions of the dielectric layer 32 may be located precisely within the plane of the entrance to each groove 21, 22.

The Bragg elements 11, 12 and the airgaps 33, 34 are positioned over the dielectric layer 14. The airgaps 33, 34 are the product of necking that occurs during the deposition of the dielectric material, which is precipitated at least in part by the aspect ratio of the grooves 21, 22 and the pitch of the Bragg elements 11, 12. The necking of the dielectric material may occur above, below, or at the plane of the respective top surfaces 27, 28 of the Bragg elements 11, 12. After the dielectric material necks, deposition of dielectric material inside the grooves 21, 22 is blocked.

The airgaps 33, 34 may be characterized by a permittivity or dielectric constant of near unity (i.e., vacuum permittivity). The airgaps 33, 34 may be filled by atmospheric air at or near atmospheric pressure, may be filled by another gas at or near atmospheric pressure, or may contain atmospheric air or another gas at a sub-atmospheric pressure (e.g., a partial vacuum). The index of refraction of a substance generally scales with permittivity. The airgaps 33, 34 have an index of refraction that is significantly lower than the index of refraction of the dielectric material of the dielectric layer 32. The dielectric layer 32 and airgaps 33 collectively provide a portion of the cladding for the Bragg elements 11, and the dielectric layer 32 and airgaps 34 collectively provide a portion of the cladding for the Bragg elements 12. The introduction of the airgaps 33, 34 increases the effective index contrast relative to the semiconductor material of the Bragg elements 11, 12 in comparison with grooves that are fully filled by a solid dielectric material alone.

Figure 3:
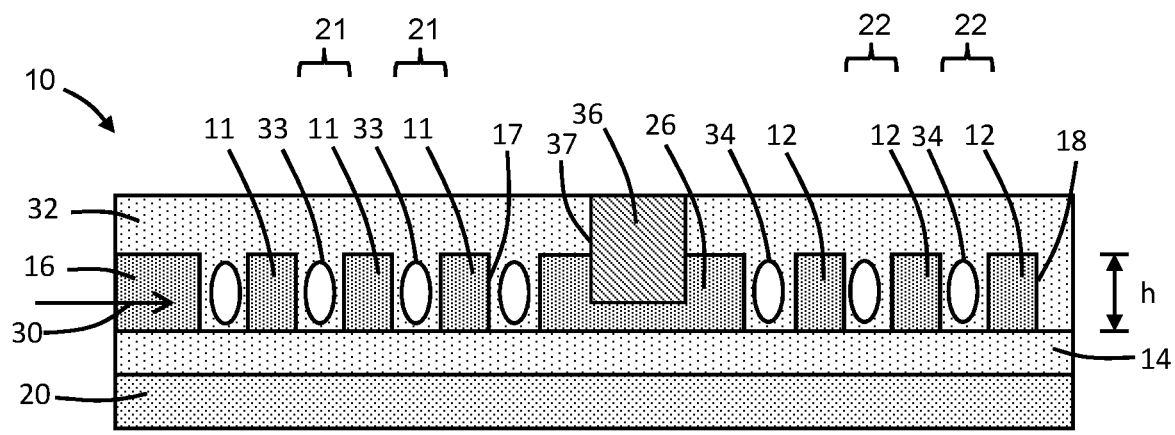

With reference to FIG. 3 in which like reference numerals refer to like features in FIG. 2 and at a subsequent fabrication stage, a photodetector 36 is formed in the section of the device layer 26 positioned between the Bragg elements 11 and the Bragg elements 12. The photodetector 36 may be formed in a trench 37 that is patterned by lithography and etching processes in the dielectric layer 32 and the device layer 26. The photodetector 36 may be composed of germanium that is epitaxially grown from the single-crystal semiconductor material of the device layer 26. The photodetector 36 may be positioned partially in the portion of the trench 37 located in the section of the device layer 26 and partially in the portion of the trench 37 located in dielectric layer 32.

In use, the waveguide 16 may be used to route a stream of optical signals 30 in a path to the Bragg elements 11, 12 and the photodetector 36. The photodetector 36 converts the optical signals received via the waveguide 16 into pulses of electrical current by photon absorption. The Bragg elements 11 may be designed to have good transmission and moderate reflection, and the Bragg elements 12 may be designed to maximize reflection. The design may be provided using Bragg's law to select the grating dimensions at the operating wavelength. The electromagnetic radiation in the optical signals 30 may be transmitted by the Bragg elements 11 with a fraction of the photons being absorbed by the photodetector 36 and another fraction of the photons traveling past the photodetector 36 to the Bragg elements 12. These photons may be reflected by the Bragg elements 12 in a rearward direction back toward the photodetector 36. A fraction of the reflected photons are absorbed by the photodetector 36 and another fraction of the photons travel past the photodetector back to the Bragg elements 11. A fraction of these photons is reflected by the Bragg elements 11 in a rearward direction back toward the photodetector 36 and another fraction is lost. The reflections may continue in a manner similar to a Fabry-Perot cavity. The result is that the number of photons being absorbed by the photodetector 36 is effectively increased in comparison with the absence of the Bragg elements 11, 12 in that multiple opportunities for absorption are created by the reflections.

Figure 3A:
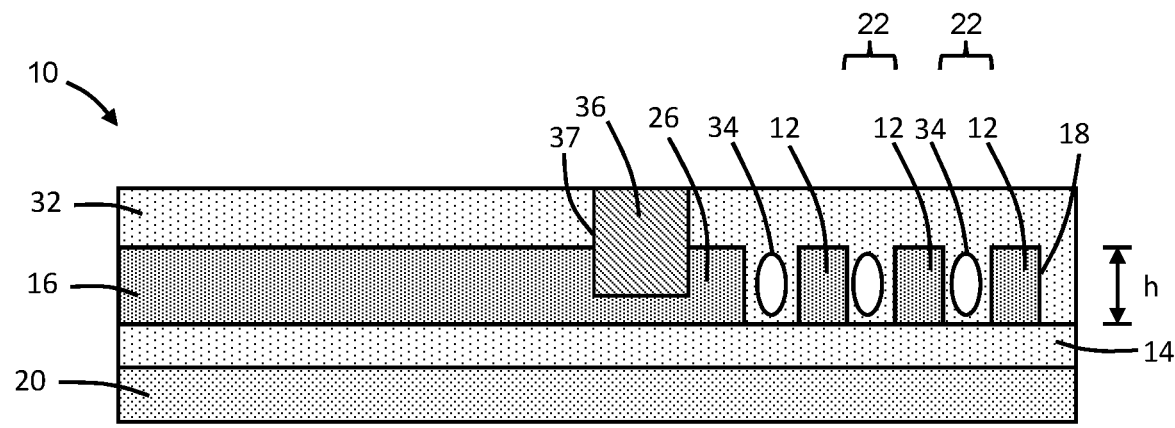
FIG. 3A is a cross-sectional view of a structure in accordance with alternative embodiments of the invention.

In an alternative embodiment and as shown in FIG. 3A, the Bragg elements 11 may be omitted from the structure 10 such that only the photodetector 36 is arranged between the Bragg elements 12 and the waveguide 16. The elimination of the Bragg elements 11 also eliminates the placement of airgaps 33 between the waveguide 16 and the photodetector 36. The Bragg elements 12 remain to reflect a fraction of the photons that travel past the photodetector 36 in a rearward direction back toward the photodetector 36.

One or more additional dielectric layers (not shown) may be formed over the dielectric layer 32 and the photodetector 36. The one or more additional dielectric layers may be formed by middle-of-line or back-end-of-line processing.

Figure 4:
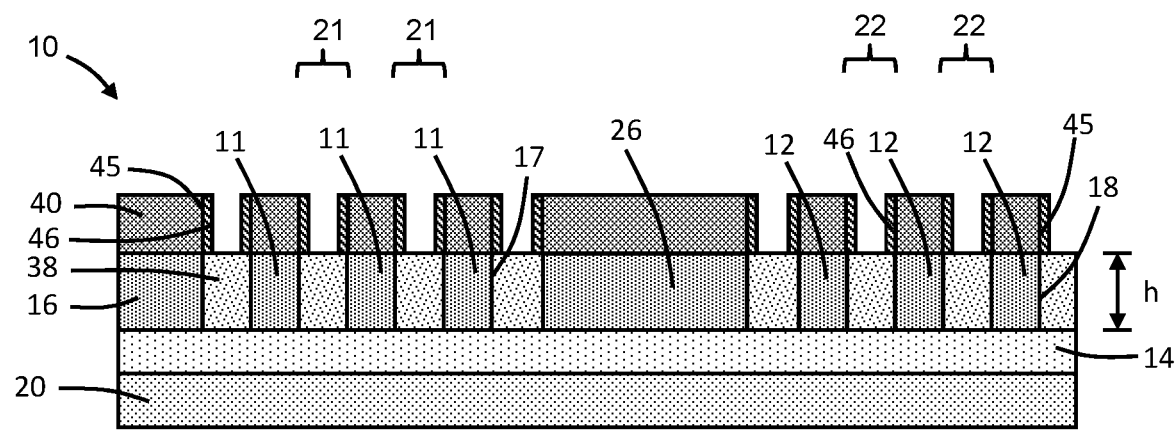
FIGS. 4-6 are cross-sectional views of a structure at successive fabrication stages of a processing method in accordance with alternative embodiments of the invention.

With reference to FIG. 4 in which like reference numerals refer to like features in FIG. 2 and in accordance with alternative embodiments of the invention, the grooves 21, 22 may be initially filled with portions of a sacrificial layer 38 composed of a material, such as an oxide (e.g., silicon dioxide), a resist, or amorphous carbon, that is removable selective to the Bragg elements 11, 12. As used herein, the term "selective" in reference to a material removal process (e.g., etching) denotes that, with an appropriate etchant choice, the material removal rate (i.e., etch rate) for the targeted material is greater than the removal rate for at least another material exposed to the material removal process.

A hardmask 40 is deposited and patterned by lithography and etching processes to form openings that are positioned directly over the portions of the sacrificial layer 38. The hardmask 40 may be composed of a dielectric material, such as silicon nitride, that is deposited by chemical vapor deposition. The portions of the sacrificial layer 38 block the deposition of the dielectric material of the hardmask 40 inside the grooves 21, 22. Sections of the hardmask 40 is arranged over the top surfaces 27, 28 (FIG. 1) of the Bragg elements 11, 12, and sections of the hardmask 40 also cover the section of the device layer 26 and the waveguide 16.

Spacers 46 are formed inside the openings between the sections of the hardmask 40 and cover the sidewall 45 surrounding each opening in the hardmask 40. The spacers 46 may be formed by depositing a conformal layer that coats the sections of the hardmask 40 and the portions of the sacrificial layer 38, and then etching the conformal layer with an anisotropic etching process, such as reactive ion etching. The portions of the sacrificial layer 38 are revealed by removal of the conformal layer during formation of the spacers 46. The spacers 46 may be composed of a dielectric material, such as silicon nitride, that is deposited as the conformal layer by atomic layer deposition. The portions of the sacrificial layer 38 block the deposition of the dielectric material of the conformal layer inside the grooves 21, 22.

Figure 5:
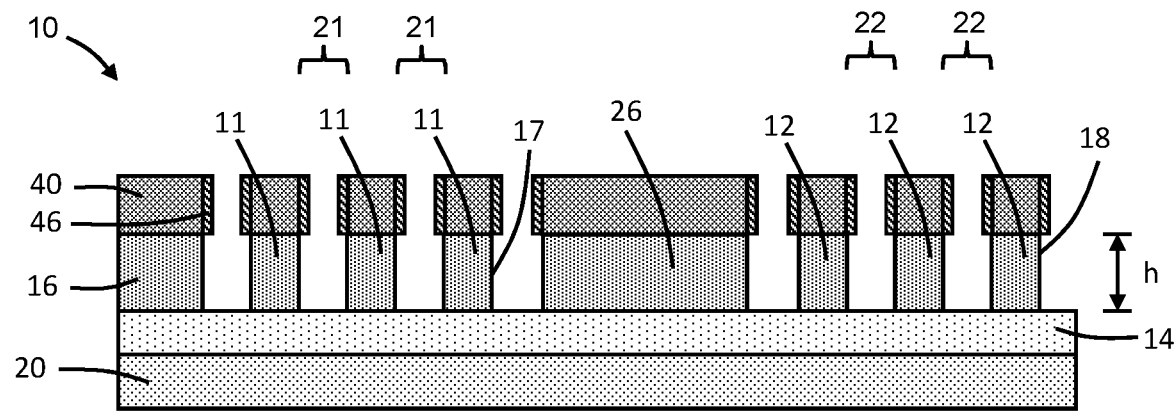

With reference to FIG. 5 in which like reference numerals refer to like features in FIG. 4 and at a subsequent fabrication stage, the portions of the sacrificial layer 38 are removed selective to the Bragg elements 11, 12, the hardmask 40, and the spacers 46 by an etching process. The removal of the portions of the sacrificial layer 38 reopens the grooves 22 between the Bragg elements 12 and also reopens the grooves 21 between the Bragg elements 11. The spacers 46 are arranged above the grooves 21, 22 and overhang respective portions of the reopened grooves 21, 22. The spacing between the spacers 46 is less than the respective widths of the grooves 21, 22 and, therefore, the spacing between the Bragg elements 11 and the spacing between the Bragg elements 12. The spacers 46 project outwardly from the sections of the hardmask 40 into the grooves 21, 22 such that the respective entrances to the grooves 21, 22 are partially occluded and effectively narrowed. The sections of the hardmask 40 and the spacers 46 are positioned above the top surfaces 27, 28 (FIG. 1) of the Bragg elements 11, 12.

Figure 6:
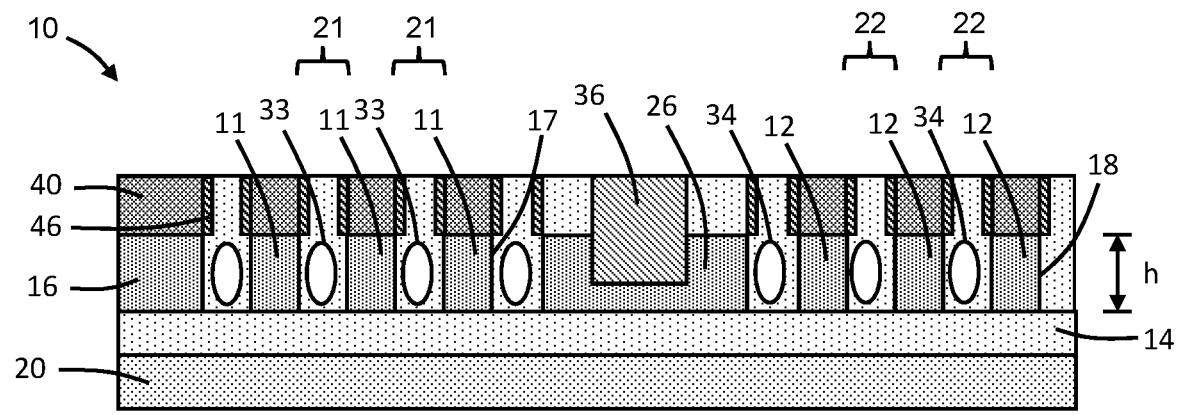

With reference to FIG. 6 in which like reference numerals refer to like features in FIG. 5 and at a subsequent fabrication stage, the dielectric layer 32 is then deposited and the airgaps 33, 34 are formed as previously described, followed by the formation of the photodetector 36 also as previously described. Due to necking, portions of the dielectric layer 32 forms over the openings in the hardmask 40 and between the spacers 46 to provide respective closures that close the airgaps 33, 34. In an embodiment, the portions of the dielectric layer 32 may provide closures between the spacers 46 at a location above the plane of the entrance to each of the grooves 21, 22. The dielectric layer 32 may or may not deposit on the sidewalls 17, 18 of the Bragg elements 11, 12 and on the dielectric layer 14 between the Bragg elements 11, 12. Native oxide may form on the sidewalls 17, 18 of the Bragg elements 11, 12 during deposition even if the dielectric layer 32 does not deposit on the sidewalls 17, 18 of the Bragg elements 11, 12.

Figure 7:
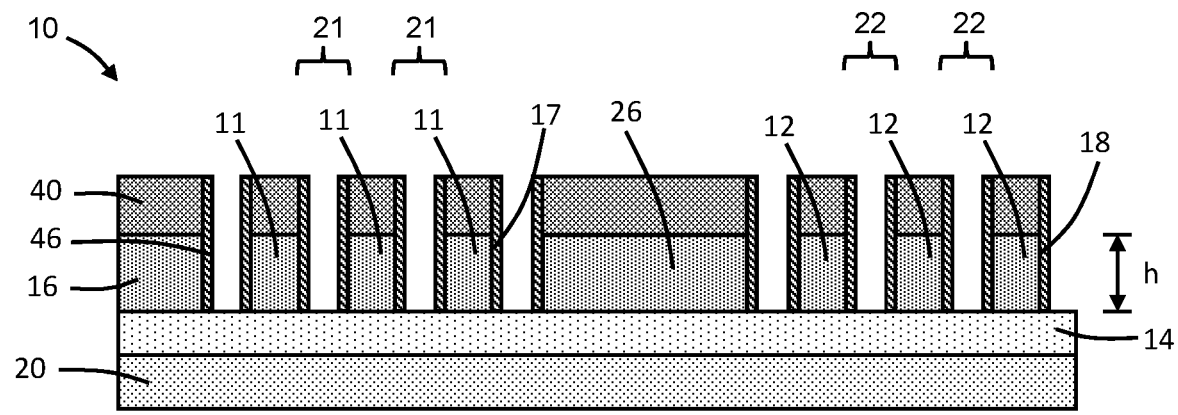
FIGS. 7-8 are cross-sectional views of a structure at successive fabrication stages of a processing method in accordance with alternative embodiments of the invention.

With reference to FIG. 7 in which like reference numerals refer to like features in FIG. 2 and at a subsequent fabrication stage in accordance with alternative embodiments of the invention, the sacrificial layer 38 may be omitted, and the patterned hardmask 40 and spacers 46 may be formed without the portions of the sacrificial layer 38 present in the grooves 21, 22. Due to the absence of the portions of the sacrificial layer 38, the spacers 46 cover the sidewalls 17, 18 of the Bragg elements 11, 12 as well as the sidewalls of the sections of the hardmask 40. The spacers 46 are effectively heightened such that the sidewalls 17, 18 of the Bragg elements 11, 12 are also covered by their dielectric material.

Figure 8:
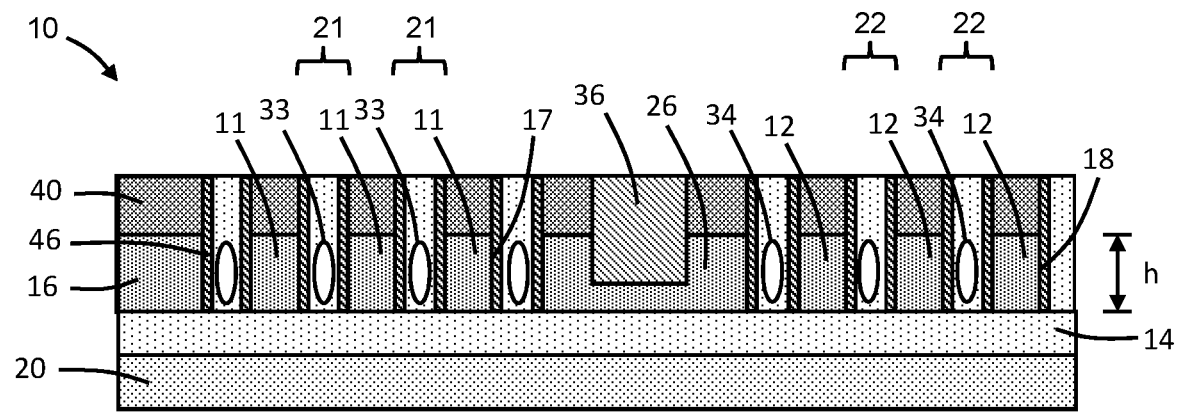

With reference to FIG. 8 in which like reference numerals refer to like features in FIG. 7 and at a subsequent fabrication stage, the dielectric layer 32 is deposited and the airgaps 33, 34 are formed as previously described, followed by the formation of the photodetector 36, also as previously described. The presence of the spacers 46 the sidewalls 17, 18 of the Bragg elements 11, 12 may prevent native oxide formation during the deposition of the dielectric layer 32.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a waveguide;
   a plurality of Bragg elements positioned adjacent to the waveguide, the plurality of Bragg elements separated by a plurality of grooves that alternate with the plurality of Bragg elements; and
   a dielectric layer including first portions positioned to close the plurality of grooves to define a plurality of airgaps, the plurality of airgaps respectively arranged between adjacent pairs of the plurality of Bragg elements,
   wherein each of the plurality of Bragg elements has a sidewall, and the dielectric layer includes second portions that are respectively positioned on the sidewall of each of the plurality of Bragg elements.

2. The structure of claim 1 further comprising:
   a photodetector positioned adjacent to the plurality of Bragg elements.

3. A structure comprising:
   a waveguide;
   a first plurality of Bragg elements positioned adjacent to the waveguide, the first plurality of Bragg elements separated by a first plurality of grooves that alternate with the first plurality of Bragg elements;
   a second plurality of Bragg elements positioned adjacent to the waveguide, the second plurality of Bragg elements separated by a second plurality of grooves that alternate with the second plurality of Bragg elements, the second plurality of Bragg elements laterally positioned between the first plurality of Bragg elements and the waveguide; and
   a first dielectric layer including first portions positioned to close the first plurality of grooves to define a first plurality of airgaps and second portions positioned to close the second plurality of grooves to define a second plurality of airgaps, the first plurality of airgaps respectively arranged between adjacent pairs of the first plurality of Bragg elements, and the second plurality of airgaps respectively arranged between adjacent pairs of the second plurality of Bragg elements.

4. The structure of claim 3 wherein each of the first plurality of Bragg elements has a top surface, each of the first plurality of grooves has an entrance that is coplanar with the top surface of each adjacent pair of the first plurality of Bragg elements, and each of the first portions of the first dielectric layer is positioned at or above the entrance to one of the first plurality of grooves.

5. The structure of claim 3 further comprising:
   a photodetector positioned adjacent to the first plurality of Bragg elements.

6. The structure of claim 5 further comprising:
   a second dielectric layer; and
   a semiconductor layer having a section over the second dielectric layer,
   wherein the first plurality of airgaps and the photodetector are positioned over the second dielectric layer, and the photodetector is positioned in a trench located partially in the section of the semiconductor layer and partially in the first dielectric layer.

7. The structure of claim 3 further comprising:
   a photodetector laterally positioned between the second plurality of Bragg elements and the first plurality of Bragg elements.

8. The structure of claim 7 further comprising:
   a second dielectric layer; and
   a semiconductor layer having a section located over the second dielectric layer,
   wherein the first plurality of airgaps, the second plurality of airgaps, and the photodetector are positioned over the second dielectric layer, and the photodetector is positioned in a trench located partially in the section of the semiconductor layer and partially in the first dielectric layer.

9. The structure of claim 3 wherein each of the first plurality of grooves has a width, and each of the first plurality of Bragg elements has a height that is greater than the width.

10. The structure of claim 3 wherein the first portions of the first dielectric layer at least partially surround each of the first plurality of grooves.

11. The structure of claim 3 wherein each of the first plurality of Bragg elements has a top surface, each of the first plurality of grooves has an entrance that is coplanar with the top surface of each adjacent pair of the first plurality of Bragg elements, and further comprising:
    a plurality of spacers, each spacer positioned over the entrance to one of the first plurality of grooves.

12. The structure of claim 3 wherein each of the first plurality of Bragg elements has a sidewall, and further comprising:
    a plurality of spacers, each spacer including a first portion positioned inside one of the first plurality of grooves on the sidewall of a respective one of the first plurality of Bragg elements.

13. The structure of claim 12 wherein each of the first plurality of Bragg elements has a top surface, each spacer further includes a second portion over the first portion, and the second portion of each spacer is positioned above the top surface of the respective one of the first plurality of Bragg elements.

14. The structure of claim 3 further comprising:
    a hardmask including a plurality of sections, each section of the hardmask positioned over a respective one of the first plurality of Bragg elements.

15. The structure of claim 14 wherein each section of the hardmask includes a sidewall, and further comprising:
    a plurality of spacers, each spacer arranged on the sidewall of a respective one of the plurality of sections of the hardmask and over the respective one of the first plurality of Bragg elements.

16. The structure of claim 3 wherein each of the first plurality of Bragg elements has a sidewall, and the first dielectric layer includes third portions that are respectively positioned on the sidewall of each of the first plurality of Bragg elements.

17. A method comprising:
patterning a semiconductor layer to form a plurality of Bragg elements positioned adjacent to a waveguide;
depositing a dielectric layer over the plurality of Bragg elements; and
forming a photodetector positioned between the plurality of Bragg elements and the waveguide,
wherein the photodetector is positioned in part in a trench in the dielectric layer, the plurality of Bragg elements are separated by a plurality of grooves that alternate with the plurality of Bragg elements, and the dielectric layer includes portions positioned to close the plurality of grooves to define a plurality of airgaps.

18. The method of claim 17 further comprising:
forming portions of a sacrificial layer in each of the plurality of grooves; and
patterning a hardmask including a plurality of sections, wherein each of the plurality of sections of the hardmask is positioned over a respective one of the plurality of Bragg elements.

19. The method of claim 18 further comprising:
forming a plurality of spacers; and
after forming the plurality of spacers, removing the portions of the sacrificial layer,
wherein each spacer is arranged above a respective one of the portions of the sacrificial layer, and the dielectric layer is deposited on the plurality of Bragg elements after removing the portions of the sacrificial layer.

20. The method of claim 17 further comprising:
forming a plurality of spacers,
wherein each spacer is arranged on a sidewall of a respective one of the plurality of Bragg elements, and the dielectric layer is deposited on the plurality of Bragg elements after forming the plurality of spacers.

\* \* \* \* \*